Patented June 10, 1924.

1,497,193

UNITED STATES PATENT OFFICE.

KUMAKICHI NISHIO, OF LOS ANGELES, CALIFORNIA, ASSIGNOR TO CHOKICHI MATSUOKA, OF LOS ANGELES, CALIFORNIA.

CONCENTRATED FOOD COMPOSITION AND METHOD OF MAKING THE SAME.

No Drawing.  Application filed January 29, 1923. Serial No. 615,726.

*To all whom it may concern:*

Be it known that I, KUMAKICHI NISHIO, a subject of the Emperor of Japan, residing at Los Angeles, in the county of Los Angeles and State of California, have invented and discovered a new Concentrated Food Composition and Method of Making the Same, of which the following is a specification.

An object of this invention is to provide a food composition of highly condensed character that will be palatable and will retain the agreeable flavor and the greater part of the food values of the substance treated and will not deteriorate in quality or flavor through age or climatic conditions, and will improve in flavor as its age increases.

I have discovered that agar has the property of absorbing and retaining nutritious substances and maintaining the same in a practically dehydrated state, for long periods of time without deterioration; and that such substances thus retained constitute a highly concentrated food product which may be used as a food, either in its concentrated form or diluted with a suitable liquid.

I have also discovered that by allowing such food product composition to mold and by removing the mold, the flavor is improved so that compositions made from fish may be freed from all disagreeable fishy odors, and a wholesome and agreeable food product thus be made.

I have discovered that substances such as meat, fish, fowl, vegetables and fruit can be reduced to a highly concentrated character with an attendant increase of agreeable characteristic flavor, by properly combining agar with the fluid extract of such substances, and properly dehydrating the product; and that a superior composition is secured by properly curing such dehydrated product.

My newly discovered dehydrated food composition comprises a nutritive extract intimately combined with agar and it more particularly includes a dehydrated and cured combination of agar and nutritive extract, said nutritive extract being intimately combined with the agar.

An object is to produce a concentrated flavor extract for soups, gravies and other food preparations.

I will now describe the method of producing a food composition in accordance with my discovery as adapted to fish, as an example, with the understanding that a like method may be employed with other food materials with such changes as may be appropriate, and which will readily suggest themselves to the operator.

The fish are first prepared for a thorough cooking in water; the small fish, such as sardines, being simply washed to free them from salt water and impurities, and the larger fish being properly cleaned as usual for cooking.

The fish when properly prepared are thoroughly cooked in boiling water; that is to say, at a temperature of about 212 degrees for a suitable length of time, say from 3 to 10 hours, according to the size of the fish. By cooking the fish under pressure at a higher temperature, a shorter period of time may serve.

The fish is thus cooked with a sufficient quantity of water to completely dissolve the nutritive substances of the fish, thus producing a nutritive liquid or soup which is then separated from the solids by straining the liquid through a filter and by pressing the residue until the liquid is all expressed. The solid residue may be set aside for fertilizer or any other use to which it may be adapted.

The hot liquid is allowed to stand until the fish oil rises to the surface, and the oil is then skimmed off; thus leaving the liquid free from oil and avoiding likelihood of the product becoming rancid.

The clear liquid or soup is further boiled for the purpose of evaporating excess moisture, and will be thus reduced in volume until it only contains sufficient moisture to dissolve the agar that is to be added.

If it is desired to season the liquid, the required seasoning such as salt may now be added to taste. Then agar is added in the proportions of from 2 to 10 ounces avoirdupois, of agar to one gallon of the liquid according to the purpose of the manufacturer, to increase the hardness of the uncured product. The larger the proportion of agar, the harder the uncured product will be.

After the agar is added, the composition will be boiled until the agar is completely dissolved, and the composition is then poured into molds of suitable size and allowed to cool until the substance solidifies. The size of the molds may be determined by the convenience of the trade, and the convenient period for curing the product. Molds ranging from half pound to any other desired size may be found most desirable, or the substance may be poured into pans and cut into cakes if so desired.

The solidified product is then dried in a suitable manner either in the sun in the open air, or in a drying room, until the moisture is largely evaporated.

The solid product is then cured by a sweating, molding, scraping and drying process which may be conducted as follows:

The solidified cakes or pieces of the product are subjected to temperature and atmospheric conditions adapted to produce a growth of mold upon its surface. Such mold may be produced by placing the cakes in a damp, warm, still atmosphere.

When covered with a coat of mold the product is exposed to a dry atmosphere and when the mold is dried it is scraped or brushed off and the product is returned to the mold producing atmosphere, and this process is repeated until the product is free from any disagreeable odor or taste.

The final cured product will then be subjected to a drying process until the dry product is a hard amorphous mass that can be grated or shaved off and reduced to a powder.

In practical employment of this invention and discovery 2 ounces of the cured product can be obtained by boiling 10 pounds cleaned fish including the bones in 5 gallons of water and $\frac{1}{32}$ ounce of agar added in the manner herein before stated; the fish being boiled in the open air and the water evaporated until the liquid is condensed to about 4 ounces avoirdupois and then the $\frac{1}{32}$ ounce of agar is added and the composition thus formed boiled again until the agar is completely dissolved and the substance allowed to solidify and when it is thoroughly cured and dried it will weigh about 2 ounces avoirdupois.

The solidified product, before being dried is soft and plastic and as the successive drying, molding, and denuding of mold proceeds, the product becomes tough and it finally becomes a hard homogeneous amorphous mass which can be shaved off with a sharp knife and can also be grated with a grater and thus brought to a powdered condition which allows it to be readily dissolved in boiling water.

When so dissolved it may be used in such proportions of water and other substances as the judgment and taste of the cook may determine for the desired dish.

It is understood that the method above set forth may be employed with any nitrogenous foods and that any palatable soup made from fish flesh, fowl, or vegetables or any palatable combination of such materials may be concentrated and incorporated with the agar to produce a product in accordance with this invention and discovery.

I claim:

1. The method set forth of producing a food composition which consists of intimately combining liquid nutritive extract of nitrogenous food material with agar, reducing the product to a solid form; allowing the solid product to mold and removing the mold.

2. The method set forth of producing a food composition which consists of intimately combining liquid nutritive extract of nitrogenous food material with agar, reducing the product to a solid form; allowing the solid product to mold; removing the mold and drying the product.

3. The method of preserving the nutritive content of nitrogenous food material which consists in combining agar with a liquid extract of such material; evaporating the product to produce a solid; causing the same to mold, removing the mold, drying the product, and repeating the molding and removal of mold until a hard product is obtained.

4. The flavoring material set forth consisting of a condensed extract of fish free from fish oil and agar in intimate combination; said flavoring material being a hard amorphous substance that can be grated and that can be shaved off with a sharp knife and that can be reduced to a powder and that is of a pronounced flavor.

5. The method set forth of producing a food composition which consists of obtaining a nutritive liquid extract from nitrogenous food material; removing the oil from such extract; then evaporating the product; then adding agar to such product; then boiling the mixture until the agar is dissolved; and then solidifying and drying the mixture.

6. The method set forth of producing a food composition which consists of obtaining a nutritive liquid extract from nitrogenous food material; removing the oil from such extract; then evaporating the product; then adding agar to such product; then boiling the mixture until the agar is dissolved; then solidifying the mixture; causing the same to mold; and then removing the mold and drying the product.

7. The method set forth of producing a food composition which consists of obtaining a nutritive liquid extract from nitrogenous food material; then evaporating the product; then adding agar to such product; then boiling the mixture until the agar is dissolved; then solidifying the mixture;

causing the same to mold; and then removing the mold and drying the product.

8. The method set forth of producing a food composition which consists of cooking fish to dissolve the nitritive substances of the fish; separating the solids from the liquid; removing the fish oil from the liquid evaporating the product; dissolving agar in the product; and allowing the composition to solidify.

9. The method set forth of producing a food composition which consists of cooking fish to dissolve the nutritive susbtances of the fish; separating the solids from the liquid; removing the fish oil from the liquid; evaporating the product; dissolving agar in the product; allowing the composition to solidify; allowing the solid product to mold; and removing the mold and drying the product.

In testimony whereof, I have hereunto set my hand at Los Angeles, California, this 19th day of January, 1923.

KUMAKICHI NISHIO.

Witness:
JAMES R. TOWNSEND.